A. S. KINNER & M. H. PAINE.
SEAT HINGE.
APPLICATION FILED MAY 15, 1914.
1,176,296.
Patented Mar. 21, 1916.
2 SHEETS—SHEET 1.
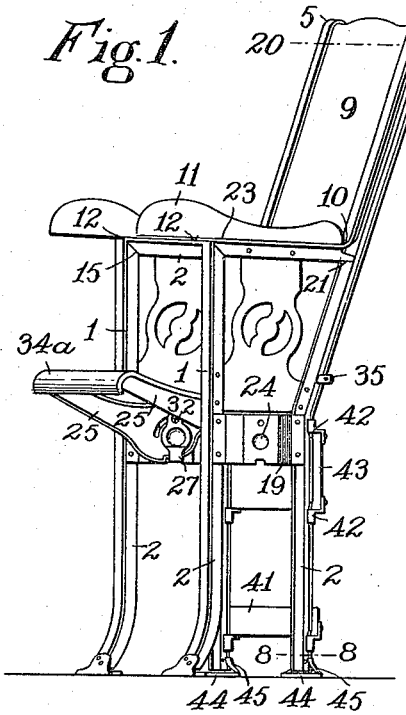
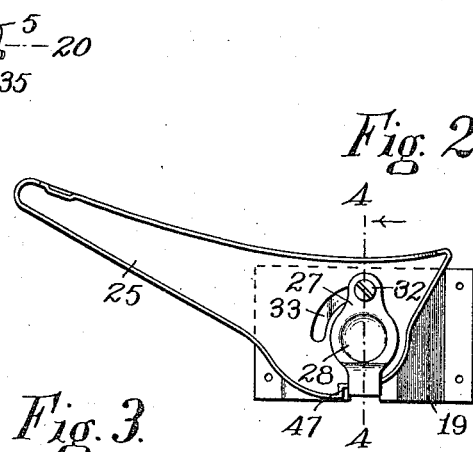
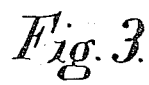
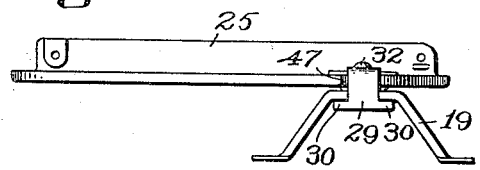
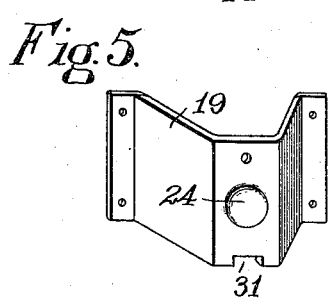
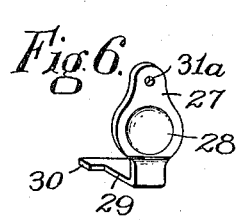
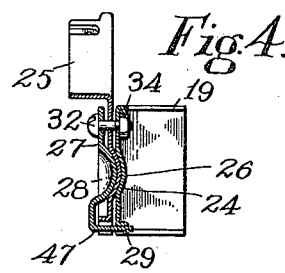
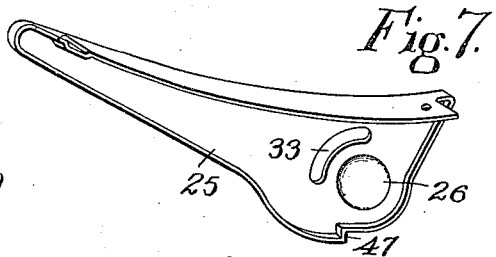
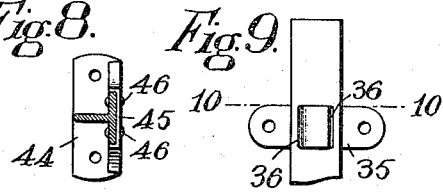
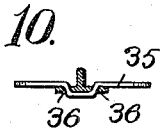
Witnesses
Roy D. Tolman.
Penelope Comberbach.
Inventors
Albert S. Kinner.
Mathew H. Paine.
By Fowler & Kennedy
Attorneys
THE COLUMBIA PLANOGRAPH CO., WASHINGTON, D. C.

A. S. KINNER & M. H. PAINE.
SEAT HINGE.
APPLICATION FILED MAY 15, 1914.
1,176,296.
Patented Mar. 21, 1916.
2 SHEETS—SHEET 2.
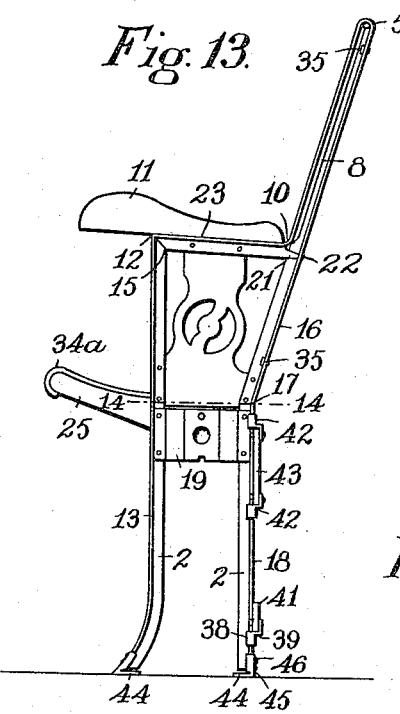
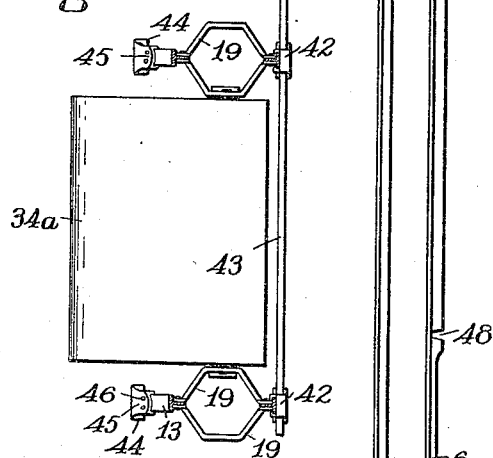
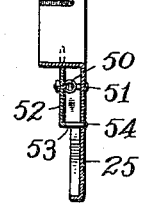
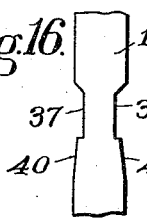
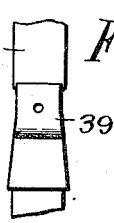
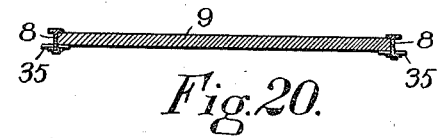
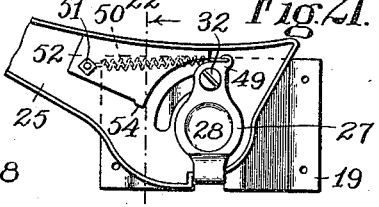
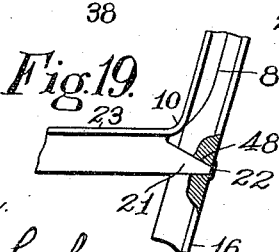
Witnesses
Roy D. Tolman
Penelope Cumberbach
Inventors.
Albert S. Kinner.
Mathew H. Paine.
By Fowler & Kenneally
Attorneys
THE COLUMBIA PLANOGRAPH CO., WASHINGTON, D. C.

UNITED STATES PATENT OFFICE.

ALBERT S. KINNER AND MATHEW H. PAINE, OF GLENELLYN, ILLINOIS, ASSIGNORS TO HEYWOOD BROTHERS AND WAKEFIELD COMPANY, OF GARDNER, MASSACHUSETTS, A CORPORATION OF NEW JERSEY.

SEAT-HINGE.

1,176,296.  Specification of Letters Patent.  Patented Mar. 21, 1916.

Original application filed April 12, 1910, Serial No. 554,915. Patent No. 1,148,905, patented August 3, 1915. Divided and this application filed May 15, 1914. Serial No. 838,856.

*To all whom it may concern:*

Be it known that we, ALBERT S. KINNER and MATHEW H. PAINE, both citizens of the United States, residing at Glenellyn, in the county of Dupage and State of Illinois, have invented a new and useful Improvement in Seat-Hinges, of which the following, together with the accompanying drawings, is a specification.

Our invention relates to improvements in seat hinges for folding chairs and similar articles having a hinged seat, and the object of our invention is to provide improved means for the support and operation of the hinged seat.

This application is a division of application Serial No. 554,915, filed by us April 12, 1910, for a folding chair. We attain this object by the mechanism illustrated in the accompanying drawing, in which—

Figure 1 represents in perspective view a chair embodying our invention. Fig. 2 is a side view of one of the rocking seat supporting arms. Fig. 3 is a bottom view of the same. Fig. 4 is a sectional view of the frictional connection between the rocking seat supporting arm and the framework of the chair. Fig. 5 is a detached perspective view of the bracket to which one of the seat supporting arms is attached. Fig. 6 is a detached perspective view of the friction clamp for holding the seat supporting arm. Fig. 7 is a detached perspective view of the seat supporting arm. Fig. 8 is a top view of one of the chair feet, the chair leg being shown in sectional view on the plane of the broken line 8—8, Fig. 1. Fig. 9 is a rear view of a portion of the back frame. Fig. 10 is a top view of the same shown in section on the plane of the broken line 10—10, Fig. 9. Fig. 11 represents the T-shaped strip which is bent to form one side of the chair frame. Fig. 12 represents the T-shaped strip in the form in which it is delivered from the rolling mill. Fig. 13 is a side view of our improved chair. Fig. 14 is a plan view shown in section on the plane of the broken line 14—14, Fig. 13. Fig. 15 is a detached perspective view of one of the sheet metal brackets for supporting one end of the foot rail. Fig. 16 represents a portion of the chair leg, showing the recessed sides to receive the foot rail bracket. Fig. 17 is a view of a portion of the frame with a bracket for holding the foot rail attached thereto. Fig. 18 is a plan view of one of the foot rail brackets attached to the chair leg, which is shown in transverse sectional view. Fig. 19 is a detached view of a portion of the framework shown partly in section and illustrating the construction of the chair frame. Fig. 20 is a transverse sectional view through the chair back on the plane of the broken line 20—20, Fig. 1. Fig. 21 represents a portion of one of the seat supporting arms with a spring applied thereto for lifting the seat. Fig. 22 is a sectional view of the same on the plane of the broken line 22—22, Fig. 21.

Similar reference characters refer to similar parts in the different figures.

Referring to the accompanying drawings, 1, 1 denote the two sides of the chair frame, which are substantially identical in construction and are each formed from a single strip of sheet metal rolled in a continuous length and T-shaped in cross section, the stem of the T consisting of a longitudinal rib 2. In the construction of one side of the chair frame, a single strip, shown at 3, Fig. 12, and provided on one side with the longitudinal rib 2, is cut the proper length for the completed chair frame.

Near the central section of the strip 3 a short section of the rib 2 is cut away to form a notch, as shown at 4, Fig. 11, to enable the strip to be bent upon itself by a semi-circular bend to form the chair back, as shown at 5, Figs. 1 and 13. Upon each side of the notch 4 the longitudinal rib is cut away to form the narrow strips 6, 6, Fig. 11, so that, when the strip 3 is bent upon itself at 5, the edges 7, 7 will come in contact, as shown at 8, Fig. 13, forming recesses in which the edges of a wooden back 9 are inserted, as shown in sectional view in Fig. 20. The metal strip is then bent at 10 into a substantially horizontal position to form a support for the arm 11. It is again bent at substantially right angles at 12 and extended downward to form the front leg 13, the V-shaped notch 14, Fig. 11, having been formed in the rib 2 to form the miter joint 15. The rear portion of the strip is extended downward, as shown at 16, Fig. 13, giving the proper inclination to the back of the chair until the plane of the seat is reached, where the strip is bent at 17 and extended vertically downward to form the rear leg 18 of the chair. The front and rear legs 13 and 18 are united by brackets 19 having their ends riveted or bolted to the chair legs.

At the point of the bend 10, Fig. 19, between the back and arm, the longitudinal rib 2 is split, as shown at 20, Fig. 11, so that the process of bending the strip will open the longitudinal rib and form a tapered prong 21, the end of which is passed through an opening in the rearward portion of the strip and is riveted or headed upon the back side of the chair, as shown at 22, thereby locking the front and rear portions of the frame together on the plane of the arm supports 23. The brackets 19, one of which is shown in perspective view in Fig. 5, are provided with central concave recesses 24, each recess being in the form of a spherical segment. Held against the inner sides of the brackets 19 are rocking seat supporting arms 25, preferably shaped from sheet metal, and each having a spherical segmental recess 26, adapting the side arm to fit the corresponding recess in the bracket 19. The arms 25 are held in place by means of a friction clamp 27, shown in perspective view in Fig. 6, and having a spherical segmental recess 28 fitting the corresponding recess in the arm 25.

One end of the friction clamp 27 is provided with a right angled flange 29 having prongs 30. The flange 29 is adapted to pass through a recess 31 in the lower edge of the bracket 19, with the prongs 30, 30 engaging the inside of the bracket. The upper end of the friction clamp 27 is provided with a bolt hole 31ᵃ to receive a clamping bolt 32, which passes through the friction clamp and through a curved slot 33 in the arm 25 and also through the bracket 19 to receive a nut 34. By means of the bolt 32 the arm is clamped between the face of the bracket 19 and the friction clamp 27, the curved sides of the segmental recesses 24, 26 and 28 forming friction surfaces to resist the rocking motion of the seat arms 25, and the amount of friction exerted can be varied by loosening or tightening the bolt 32. The curved slot 33 in the seat arm 25 limits the rocking movement of the arm. The two seat arms 25 are united by a wooden or sheet metal seat 34ᵃ. The two metal frames forming the sides of the chair are connected by the seat and also by the wooden back 9, the edges of which are attached to the clips 35, each of which consists of a single piece of sheet metal which is inserted through mortises 36, 36 in the back of the frame.

The crown portion of the T-shaped strips is cut away on opposite sides to form notches, as shown at 37, 37, Fig. 16, in order to reduce its width and allow the flanged edge 38 of a foot rail supporting bracket 39 to be inserted. Immediately below the notches 37 the crown portion of the frame is tapered, as shown at 40, 40, Fig. 16, to receive the flanged edges 38 and support the bracket 39 in which the foot rail 41 rests. Brackets similar to 39 are similarly attached to the rear leg of the chair at 42, in order to support a connecting back rail 43. The lower ends of the chair legs rest upon plates 44, Fig. 8, which extend transversely across the bottom of the leg and form a support upon which the leg rests. The plates 44 are bent upwardly at 45 against the crown portion of the leg, to which they are attached by rivets 46.

The flanges 29 of the friction clamps 27 also serve as stops to limit the downward movement of the seat by their contact with the shoulders 47 of the seat arms 25, thereby providing a rigid support for the seat. The tapered prongs 21, by which the front and rear of the side frames are united, are inserted in notched openings 48, Fig. 11, in the longitudinal rib 2, thereby supporting the prongs 21 against vertical movement and relieving the riveted end 22 from strain.

To one of the seat supporting arms we apply a spring to raise the arm and normally hold the seat in a raised position. One of the clamping plates 27 is provided with an arm 49 to which one end of a spiral spring 50 is attached. The opposite end of the spring 50 is attached to a bolt 51 held in the arm 25. The bolt 51 also serves to hold in place a plate 52 which serves as a cover for the spring 50. The plate 52 has a flange 53 on its lower edge which bears against the side of the arm 25 and is provided with a spur or prong 54 passing through a small opening in the arm 25.

We claim,

1. In a chair, a side frame providing a surface having a spherical recess therein, a sheet metal plate, forming a seat supporting arm, said plate having a portion deflected from the plane of its surface to form on one side thereof a spherical projection fitting the recess of said frame, and on the opposite side a corresponding spherical recess, and a member detachably interlocked with said frame and disposed on the opposite side of said plate therefrom, said member having on its inner surface a spherical projection fitting the recess of said plate.

2. In a chair, a side frame providing a surface having a spherical recess therein, a sheet metal plate, forming a seat supporting arm, said plate having a portion deflected from the plane of its surface to form on one side thereof a spherical projection fitting the recess of said frame, and on the opposite side a corresponding spherical recess, a member detachably interlocked with said frame at one end and disposed on the opposite side of said plate therefrom, said member having on its inner surface a spherical projection fitting the recess of said plate, and means at the other end of said member for varying the friction between the coöperating recesses and projections of said frame, plate and member.

3. In an article of furniture, a member providing a surface having a circular recess therein, a plate forming a seat supporting arm, said plate having a portion deflected from the plane of its surface to form on one side thereof a circular projection fitting the recess of said member, and on the opposite side a corresponding circular recess, and a second member attached to said first member and disposed on the opposite side of said plate therefrom, said second member having on its inner surface a circular projection fitting the recess of said plate, and in axial alinement with the circular recess of the first member, whereby said plate is hinged to said members about the axis of said circular recesses and projections.

Dated this fifth day of May 1914.

ALBERT S. KINNER.
MATHEW H. PAINE.

Witnesses:
L. I. COUDON,
J. E. CUNNINGHAM,
D. J. GRENIER.

Copies of this patent may be obtained for five cents each, by addressing the "Commissioner of Patents, Washington, D. C."